US009805585B1

(12) United States Patent
Geller

(10) Patent No.: US 9,805,585 B1
(45) Date of Patent: Oct. 31, 2017

(54) DISTRESS TRANSMISSION

(71) Applicant: Safe Sex Consent Inc, Mooresville, NC (US)

(72) Inventor: Wendy Geller, Mooresville, NC (US)

(*) Notice: Subject to any disclaimer, the term of this patent is extended or adjusted under 35 U.S.C. 154(b) by 0 days.

(21) Appl. No.: 15/604,650

(22) Filed: May 25, 2017

Related U.S. Application Data

(63) Continuation-in-part of application No. 15/281,065, filed on Sep. 29, 2016.

(51) Int. Cl.
*G08B 1/08* (2006.01)
*G08B 25/01* (2006.01)
*G06F 3/0488* (2013.01)

(52) U.S. Cl.
CPC ....... *G08B 25/016* (2013.01); *G06F 3/04883* (2013.01)

(58) Field of Classification Search
CPC .......................... G08B 25/016; G06F 3/04883

USPC .................................................... 340/539.13
See application file for complete search history.

(56) References Cited

U.S. PATENT DOCUMENTS

2012/0282886 A1* 11/2012 Amis ................ H04M 1/72541
455/404.2
2015/0302217 A1* 10/2015 Liu ........................ H04L 63/08
726/30

* cited by examiner

*Primary Examiner* — Kerri McNally
(74) *Attorney, Agent, or Firm* — Da Vinci's Notebook, LLC

(57) ABSTRACT

The present invention includes a device for the transmission of a distress signal utilizing solving a graphic overlay to initiate the transmission of the distress signal. The distress signal can be transmitted discreetly and with the device's current GPS location and/or pre-loaded user profile information and/or continuing to connect the now confirmed intended Distress Signal.

12 Claims, 9 Drawing Sheets

DISTRESS TRANSMISSION

RELATED APPLICATIONS

This application is a continuation, and claims priority under 35 U.S.C. §120 from U.S. patent application Ser. No. 15/281,065 titled Distress Transmission filed on Sep. 29, 2016.

FIELD OF THE INVENTION

The present invention relates to the field of safety and more specifically to the field of crisis communication.

BACKGROUND

Recent advances in mobile computing and wireless technology have transformed smartphones, apps and websites into invaluable tools that help users with not only communicating with others, but also with managing all aspects of their personal lives and business activities. Mobile devices are increasingly being used for personal safety management as well, where mobile devices can be used to capture evidence, thwart potential perpetrators, and transmit an alert for help. In this invention it is a silent alert for help, triggered by tracing a shape to confirm intent of connecting with 911 and other emergency assistance providers. This can be converted into a call or sent as a silent request for emergency assistance at a particular location, with no sign of the alert to authorities remaining evident on the device once sent.

A primary benefit of the present invention is that it permits a discreet, fast, simple way to communicate the existence of a dangerous situation location to an emergency assistance provider with no sign of the alert to authorities remaining evident on the device once sent.

Often during an emergency, a person can not effectively communicate relevant information because of existing circumstances or disabilities: whether related to time, saying they do not know the address of their current location (because GPS got them there), when danger is close-by or in the next room, medical problems, speech or hearing difficulties, language proficiency barriers, conspicuousness or plain straight-out inability (think hostages, domestic violence, child abuse, fear-freezing) to explain the need for authorities or their advanced technological devices to come for an emergency at a specified location.

SUMMARY

The present invention includes a system for the transmission of a distress signal, along with a computer for the transmission of a distress signal, and process for transmitting the distress signal. The device includes a computer with a body and having an arithmetic logic unit ("ALU"), a nontransitory computer-readable storage medium, a display having a touch digitizer, and a transmitter for the transmission of data to an external entity. A distress routine is recited within said storage medium and includes pre-loaded user file information having access to an emergency contact database, and adapted to transmit a distress signal bearing an emergency distress category to an emergency assistance provider while divulging the user information. The display exhibits a two-dimensional graphic overlay having a graphic path length and path direction variable in two-dimensions, whereby an uninterrupted physical trace along an alarm path length of, and co-extensive with, said graphic overlay answers a solution that initiates the distress signal. The system includes the computer of the present invention along with position indicator.

The process of the present invention includes configuring a Distress Routine that includes the device's current GPS location and/or pre-loaded user profile information and/or continuing to connect the now confirmed intended Distress Signal. The process exhibits a two-dimensional graphic overlay on the display, having a graphic path length and path direction variable in two-dimensions. A distress signal is initiated with a continuous physical trace along an alarm path length of, and co-extensive with, the graphic overlay. A distress signal is transmitted bearing the device's current GPS location and/or pre-loaded user profile information and/or continuing to connect the now confirmed intended Distress Signal to a campus, municipal or federal emergency assistance provider.

These aspects of the invention are not meant to be exclusive. Furthermore, some features may apply to certain versions of the invention, but not others. Other features, aspects, and advantages of the present invention will be readily apparent to those of ordinary skill in the art when read in conjunction with the following description, and accompanying drawings.

DETAILED DESCRIPTION

Figure 1:
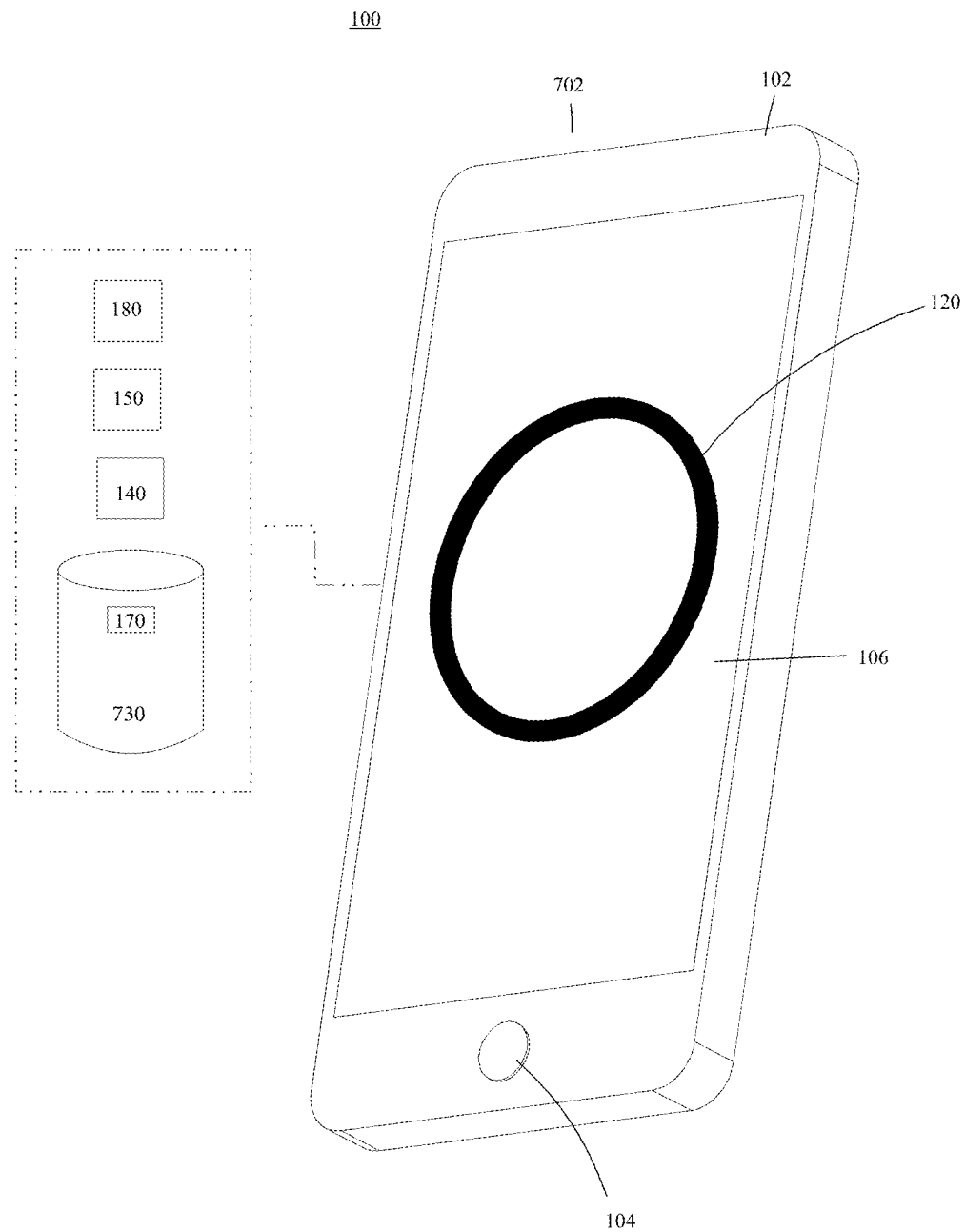
FIG. 1 is an orthographic view of the present invention.
Figure 9:
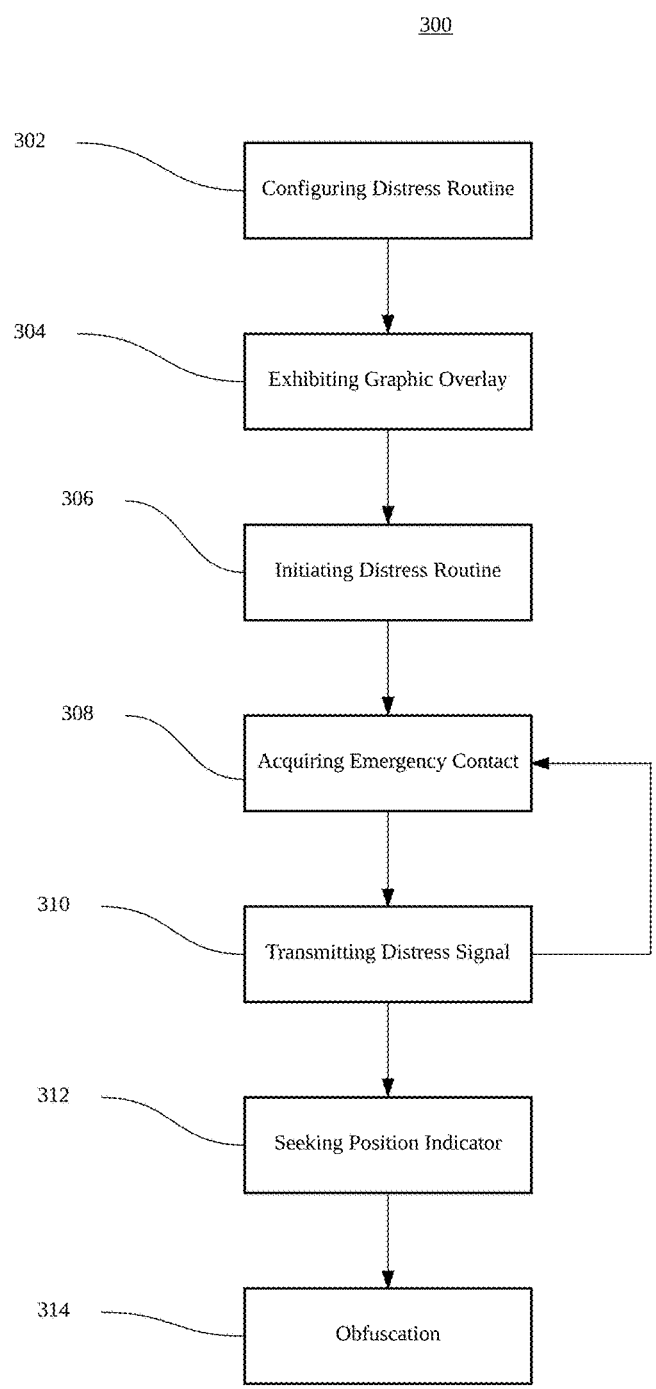
FIG. 9 is a view of the process of the present invention.

Referring first to FIGS. 1 and 9, a basic embodiment of the distress transmission device 100 and process 300 are shown. The distress signal device 100 includes a computer 702 with a body 102 and having an arithmetic logic unit 180 ("ALU"), a nontransitory computer-readable storage medium 730, a display 120, a touch digitizer 140; and a transmitter 150 for the transmission of data to an external entity (not shown). The computer may include one or many computers separated into one or more subcomponents, and the preferred computer includes a portable electronic device, e.g., smartphone or tablet or any touchscreen computer and automated teller machines (ATMs). A smartphone is the preferred example because such a device frequently includes an ALU, storage medium, display, touch digitizer, and transmitter in a single device. Furthermore, a smartphone, or other mobile computer, frequently includes a function input 104 that may subsume a variety of uses in accordance with the present invention.

Figure 7:
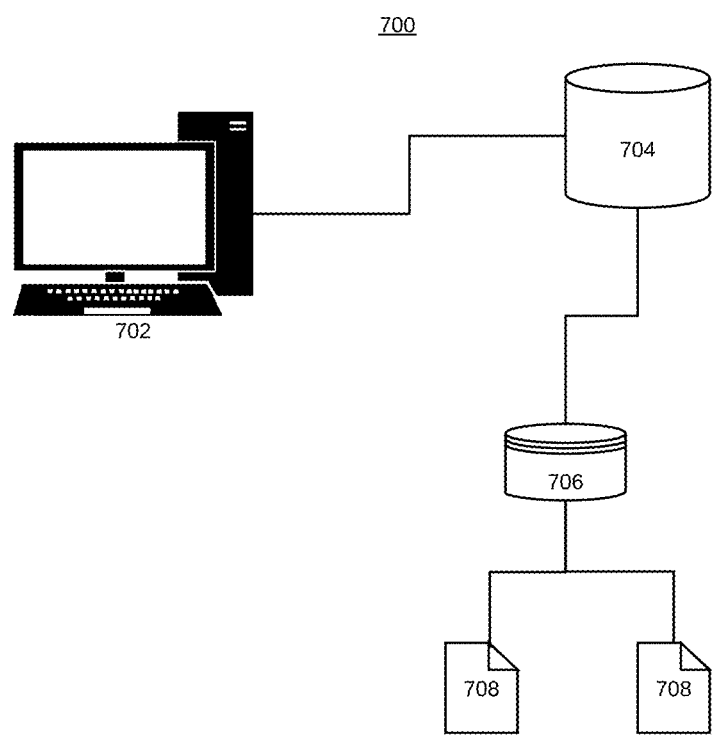
FIG. 7 is a view of a system of the present invention.
Figure 8:
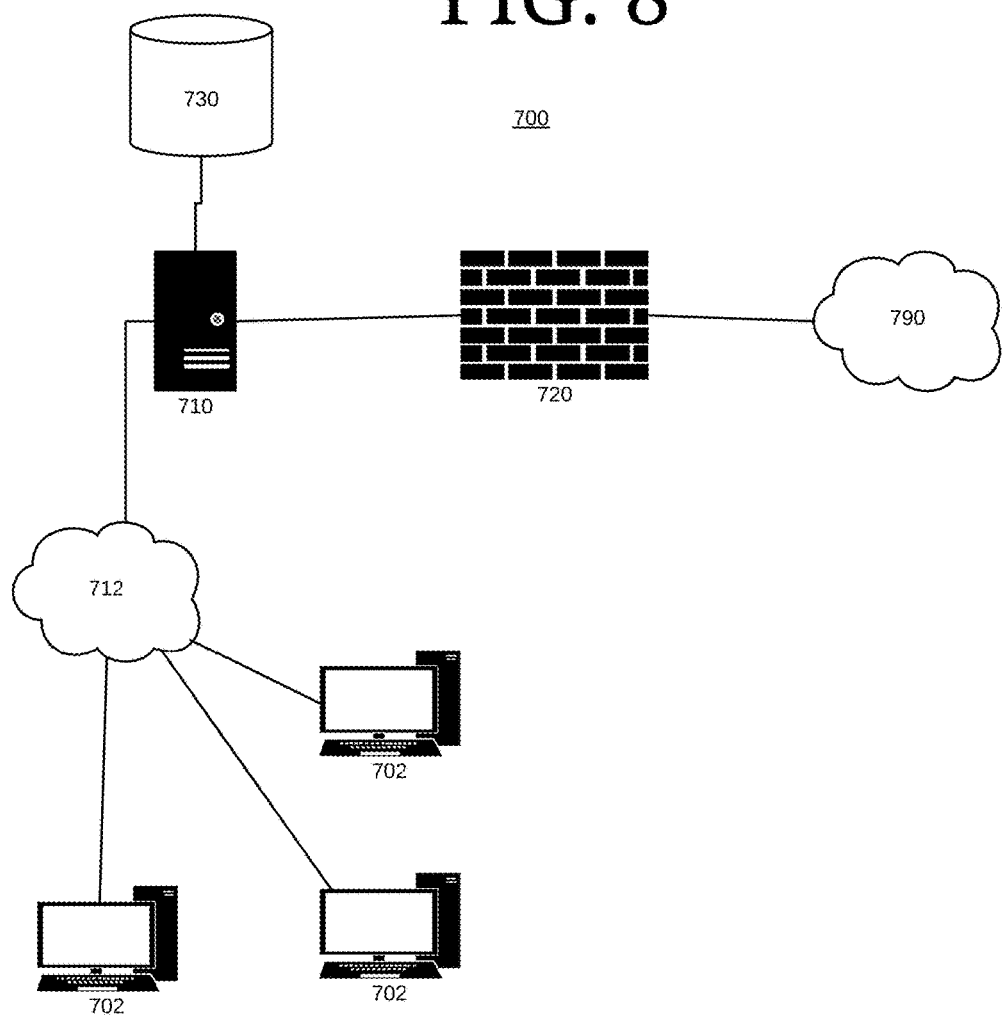
FIG. 8 is a view of a system of the present invention.

FIGS. 7-8 depict a computer ecosystem 700 of the present invention. By ecosystem it is meant one or more computers 702 that are organizationally related. The ecosystem may include computers under common ownership, computers that belong to the same network or series of networks, computers that are collaborating, etc. The present invention may be provided as a computer program product, or software that may include a computer-readable storage medium 704 having stored thereon instructions, which may be used to perform the process of the present invention across a computer ecosystem 700 according to the various embodiments disclosed herein.

A computer 702 of the present invention may include any combination of one or more computer readable media 704. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a cloud storage device or any suitable combination of the foregoing. In the context of this document, a computer readable storage medium 704 may be any tangible medium that can contain, or store a program for use by or in connection with an instruction execution system, apparatus, or device.

A computer readable signal medium 704 may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described below illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Furthermore, the functionality of one block may be subsumed by the functionality of another block as a sub-step thereof. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

An ecosystem 700 may further include a computer network or data network that allows computers to exchange data. In a computer network of the present invention, networked computing devices pass data to each other along data connections. The connections between nodes are established using cable media, wireless media, or other media. The Internet or other exterior network 790 may be a component of the ecosystem. Nodes may include hosts such as personal computers, phones, servers, and networking hardware. Two such devices are networked together when one device is able to exchange information with the other device, whether or not they have a direct connection to each other. Computer networks of the present invention support applications such as access to the World Wide Web, shared use of application and storage servers, printers, and fax machines, and use of email and instant messaging applications. Computer networks may be included irrespective of the physical media used to transmit their signals, the communications protocols to organize network traffic, the network's size, topology, and organizational intent.

It is preferred that the network of the present invention have at least one boundary 720, and potentially multiple boundaries if a demilitarized zone is utilized. The boundary 720 may include any number of layers designed to regulate and secure the flow of information between networks. Boundary layers of the present invention may include enterprise content management software, firewalls, filters, threat management software, alarms, etc. Software for establishing a boundary may be run on a server 710 with server storage 730 of the present invention, which may include directory services controlling access credentials.

To combat security risks posed by network connections, firewalls are frequently used. A firewall may be a hardware or software component that filters network traffic so that communications with unauthorized third parties are blocked but legitimate network functions may be carried out. Frequently, the filters applied by a firewall are specified by a set of policies defining characteristics of network messages that either should pass through the firewall or that should be blocked. Because different levels of communication may be appropriate depending on the origin or destination of messages, firewall policies may be provided for each application that executes on a computing device and communicates over a network.

A firewall may have an outward side facing a global network, such as the Internet. The opposite side of the firewall may be a private network that is protected by the firewall. The private network may include any number of host machines (e.g., computers) each addressable by its own IP address. The physical construction of the network may be such that all data packets intended for one of the IP addresses behind the firewall pass through the firewall. Using the firewall rules, which may be set by a network administrator or other user, the firewall may determine whether to allow or deny certain data packets and/or determine where to route particular data packets based on the IP addresses to which the packets are directed. The determination of where to route data packets may be done using the IP addresses of the host machines in the private network.

Depending on the addressing scheme used by the network, the IP addresses of the host machines may be static or dynamic. Static IP addresses do not change over time, and thus once they are set in the firewall rules, there is no need to update them. The Internet Protocol Version Four (IPv4) addressing system commonly uses static addressing, while IPv6 may use dynamic addressing. Dynamic IP addresses may change over time and thus, there is a need to update the firewall rules as changes occur. When a small Local Area Network (LAN), such as a domestic network in a private residence, is linked to a larger network such as the Internet, the link is often through a gateway router acting as a firewall. One of the functions of the firewall is to protect the LAN from intrusion from outside.

A service directory accessible by a server 710, usually on server storage 730, stores information about network resources across a domain. An example of a directory service is Active Directory. The main purpose of Active Directory is to provide central authentication and authorization services for Windows-based computers. Active Directory also allows administrators to assign policies, deploy software, and apply critical updates to an organization. Active Directory stores information and settings in a central database.

An Active Directory structure is a hierarchical framework of objects. The objects fall into three broad categories: resources (e.g. printers), services (e.g. e-mail) and users (e.g., user accounts and groups). The Active Directory provides information on the objects, organizes the objects, controls access and sets security. Certain objects can also be containers of other objects. An object is uniquely identified by its name and has a set of attributes—the characteristics and information that the object can contain—defined by a schema, which also determines the kind of objects that can be stored in the Active Directory.

Typically, the highest object in the hierarchy is the domain. The domain can be further sub-divided into containers called Organizational Units. Organizational units give a semblance of structure to the organization either based on administrative structure or geographical structure. The organizational unit is the common level at which to apply group policies, which are Active Directory objects themselves called Group Policy Objects. Policies can also be applied to individual objects or attributes as well as at the site level (i.e., one or more IP subnets).

The present invention may use one or more communication networks to foster information exchange throughout the computers of the ecosystem. Communication networks might either be private or public. In a private network, communications between multiple computers occur in a secure environment that prevents access from outside the network without appropriate authentication. These networks are considered as "trusted" networks because the communication signals securely travel from one computer to another within the private network without being exposed to the external environment.

Public networks such as the Internet, on the other hand, are not secure because the communication over these networks is not private and is susceptible to interception by other computers. In addition, the public networks cannot guarantee the delivery of the data packets being sent. They allow packets to be injected into, or ejected out of, the networks indiscriminately, and analyzed while in transit. To keep data sent over a public network private, a Virtual Private Network (VPN) is commonly established on top of a public network when two computers use the public network to communicate with each other. In a Virtual Private Network, data sent from one computer to another is encrypted by a security gateway and transmitted in encrypted form over the public network to a second security gateway connected to the receiving computer. The second gateway decrypts the data before forwarding it to the receiving computer. Such a private channel established on top of another network is referred to as a network tunnel.

In order to set up a Virtual Private Network, a user first establishes a path to a VPN server and goes through an AAA process (Authentication, Authorization and Accounting) for identification and authorization to create a secure tunnel with the server. Once the user is authorized, a secure network tunnel is established between the user and the VPN server over the public network, using a VPN protocol such as IPsec. This process requires a VPN client on the user's side, a VPN server and other VPN hardware on the other side of the tunnel, as well as appropriate user configurations.

Today's private networks often include wireless networks such as WiMAX to accommodate mobile access. In addition, to provide mobility access in a large geographic area, a private enterprise often relies on third-party wireless infrastructures besides its own wireless network. In this case, a user's device would need to be authenticated by both a third-party gateway and an enterprise authentication server before it could access the enterprise network. User credentials are typically requested by and securely returned to the third-party gateway. Once the user is authenticated and authorized, the user may communicate with the third-party wireless gateway.

The present invention includes files 708, which may include executable instructions 170 by which the present invention runs, or files upon and with which the present invention interacts. The documents may be on local storage 704 or shared storage 730 and be created, accessed, edited, and/or otherwise modified using any of a number of applications, including for example and without limitation Final Cut Pro, Avid, Microsoft Office applications (Word, Excel, Power Point, Outlook, Visio, etc.), Adobe Reader or Acrobat, AutoCAD, SolidWorks, or any other suitable document editing application. The content of the documents may be audio tracks, video clips, images, word processing documents, presentations, spreadsheets, business documents, engineering documents, databases, etc.

Returning to FIG. 1, the computer 702 includes a touch digitizer 140, which is often merely incorporated into the display 106 as a "touchscreen." Touch digitizers as of the drafting of this disclosure use capacitive touch sensors as opposed to the resistive touch sensors. The capacitive sensing digitizer layer most often uses projected capacitive touch (PCT) technology, which sees the materials used in the detection etched into the layer as a grid. This grid projects an electrostatic field when a voltage is applied, and when a human finger, which is electrically conductive, touches the area covered by the grid, the electrostatic field is altered. A controller then determines the position of the finger based on sensors and other components.

As the electrostatic field of PCT displays can only be altered by conductive materials, human skin affects the display but materials commonly used to fabricate clothing, fashion accessories, and personal items do not. The field generated by the touch digitizer is three-dimensional, which allows conductive items to alter the field notwithstanding the potential existence of nonconductive barriers, e.g. clothing. Touch screens are often capable of being transparent, or nearly so, because the material commonly used in their manufacture, indium tin oxide, is transparent. The grid is constructed from a series of small capacitors positioned at the grid intersections which allow for mutual capacitance, which in turn provides multi-touch. With LCD displays the touch digitizer layer is placed above the liquid crystal layer but below the final glass protecting layer. With some AMO-LED displays, specifically Super AMOLEDs by Samsung, the digitizer is actually integrated into the same layer as the organic light-emitting diodes, making it essentially invisible while consuming less space. Often the protective glass, digitizer and display itself are all attached tightly together in the one panel to reduce the chance of glare and reflections while saving space.

Returning to FIGS. 1, 6 and 9 the storage 730 of the computer 702 of the present invention includes machine readable instructions 170 for the Distress Routine. The Distress Routine includes multiple aspects including a user profile. A primary benefit of the present invention is that it permits a fast, simple way to communicate the existence of a dangerous situation location to an emergency assistance provider by transmitting one of the following: current GPS location and/or pre-loaded user profile information and/or continuing to connect the now confirmed intended Distress Signal to a campus, municipal, state or federal emergency assistance provider. The user can be any of the entities described in the present disclosure, sentient or not. In many instances the user will be an organism, e.g. people, pets, guard/sentry animals, etc.; and in other instances the user will be a computer, e.g. an automated teller machine, or object having access, or physically attached, to an ALU, e.g. art, guarded movable (such as gems), cars, etc.

Often during an emergency, a person can not effectively communicate relevant information because of existing circumstances or disabilities: whether related to time, saying they do not know the address of their current location (perhaps because GPS got them there), when danger is close-by or in the next room, medical problems, speech or hearing difficulties, language proficiency barriers, conspicuousness or plain straight-out inability (e.g., hostages, domestic violence, child abuse, fear-freezing) to explain the need for authorities to come for an emergency at a specified location. A user configures 302 preloaded information. This information may include phone number, name, gender, age, race, medical history, occupation, residence, additional contact information, emergency contact, vehicle information, family members and profiles, pets, etc. Additional information may include captured information. Captured information may include information that can be captured by an electronic device based on the user's use of the computer or another electronic device. Examples of captured information include geo-location, phone number, temperature, elevation, direction, browser (or other user-agent string information), IP address, sound, video, Internet history, software history, etc. This information can be transmitted to an emergency contact. Other information may include pre-recorded messages, e.g. a voice recording. Furthermore, configuring 302 may include any aspect of loading, installing, or otherwise preparing the Distress Routine.

The present invention acquires 312 emergency contact information for an emergency services provider. An emergency services provider includes any service that may be provided to a person, entity, or property to prevent a potential threat to the existence or well-being of the person, entity, or property. A preferred example of an emergency service provider includes a policing agency, such as a municipal police department, federal policing agency, county sheriff, highway patrol, or state police; and security such as Military Police, Military base security, college campus security and private company security as well. Many of these policing agencies have emergency contact accessible to the general public to provide emergency service. A policing or security agency should be notified in the event of criminal activity. A preferred example of an emergency service provider includes a medical services provider, such as a primary care physician, hospital, EMT service. A medical service provider should be called in the event of a medical issue. Other types of emergency service providers include poison control, fire departments, animal control services, etc. There are often instances when emergency service providers need to be called quickly and discreetly.

By acquiring 312 the present invention may utilize multiple acquisition pathways. A first pathway includes storing contact information in an internal database in storage 730 from which no external communications are necessary. Loading contact information may be included in the configuring step 302 of the process 300. Contact information may be manually entered for any emergency service provider, including primary and secondary service providers for a single category. By primary and secondary it is meant that there may be a preferential order of service providers that may be functionally manifested through a contact process communication order (e.g., first the primary service provider, then the second service provider), a communication type (e.g., SMTP for primary, and pre-recorded telephone message for secondary), etc. Contact information may be preferred and acquired by the invention on the basis of geographic location, time of day, or other variable. Contact information may be acquired 312 from a LAN or a WAN. Contact information can be acquired from a trusted third party provider, including white pages, yellow pages, blue pages, and other contact information service providers supplying information over a WAN. The present invention may use the geolocation data acquired 312 by the computer 702 compared with metadata related to emergency contact information.

To facilitate the notification of emergency service providers, the present invention exhibits a graphic overlay 120 that is part of the initiation 306 of a transmission to one or more emergency service providers. The preferred graphic overlay 120 is a two-dimensional graphic overlay, graphically exhibited on the computer display 106. The graphic overlay has a graphic path length and path direction variable in two-dimensions, whereby an uninterrupted physical trace along an alarm path length of, and co-extensive with, said graphic overlay answers a solution that initiates said distress signal. The graphic overlay presents a graphic puzzle that can be solved by a user by tracing part or all of the graphic overlay. For example, the graphic overlay of FIG. 1 is a circle, a user traces the circle as depicted as the graphic overlay on the display in order to create the solution that initiates the distress signal transmission.

Figure 2:
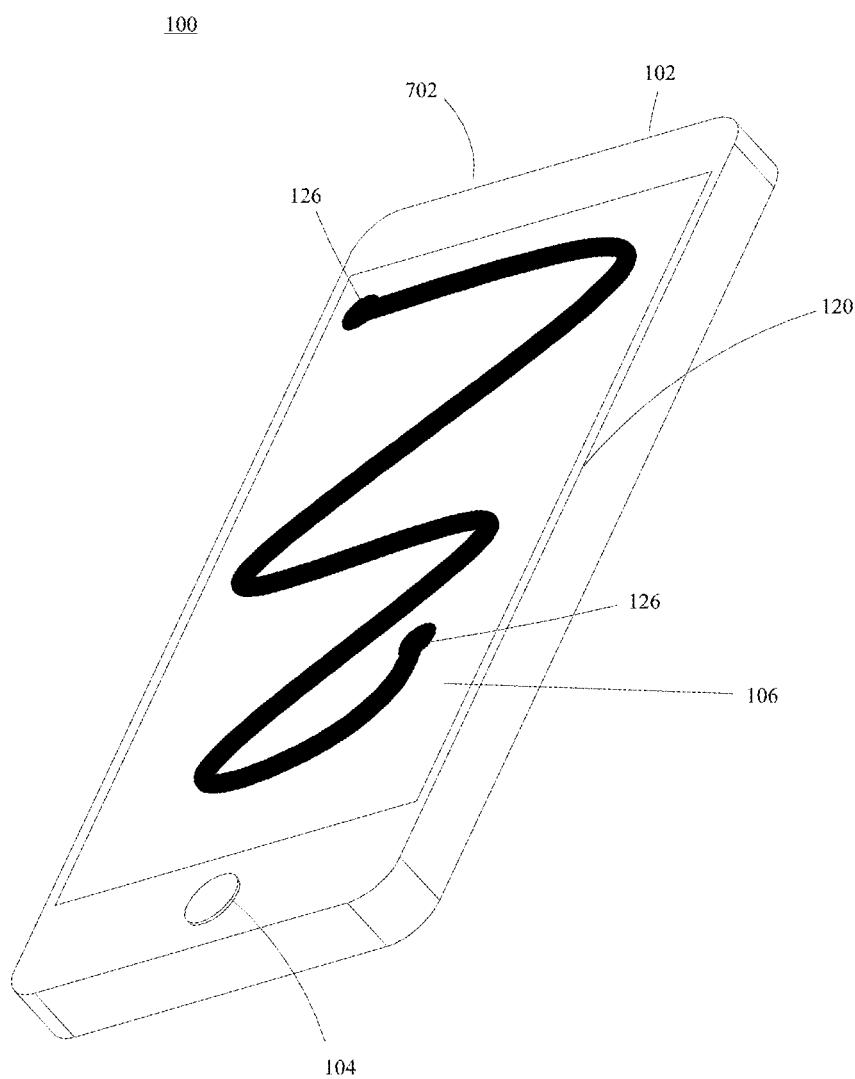
FIG. 2 is an orthographic view of the present invention.

As shown in FIG. 2, the graphic overlay 120 may take any form in keeping with the spirit and intentions of the present invention. The preferred graphic overlay includes a substantial length to ensure purposeful initiation of the distress signal. The graphic overlay therefore includes a path length, i.e. length from one end to the other, or in the case of a continuous shape, the length from a start point up until the return to the start point, at least 25% of the width or height of the display 106, and more preferably at least 100% of the width or height of the display. To further ensure purposeful initiation of the distress signal, the graphic overlay includes a shape that varies in two-dimensions. In other words, the shape is both not a straight line and not orthogonal to the perimeter lines of the display rectangle. A preferred graphic overlay includes multiple changes in direction, and more preferably abrupt.

The graphic overlay may be traced while exhibited 304 to the user on the display 106, and if so, the complexity of the graphic overlay may be more so than in situation wherein the graphic overlay is not exhibited 304 to the user at the time of the trace. The graphic overlay of FIG. 2 is an ideal shape for physical trace while exhibiting 304 to the user. The abrupt changes of the squiggly line are not easily subject to memorization; however, the abrupt changes all but ensure that a user intends to physically trace the graphic overlay and thereby transmit 308 the distress signal. The graphic overlay of FIG. 1 is ideal for situations whereby a user may trace the graphic overlay without the graphic overlay being presented to the user at the time of trace. For example, the Distress Routine of the present invention may present a blank screen to permit discreet transmission 310 of the distress signal. Exhibition 304 of the graphic overlay may be presented to a user at the time of configuring 302 of profile information, and perhaps shown to a user for a predetermined test period, but hidden from view during the initiation 306 step.

The graphic overlay may be exhibited during any meaningful time. It is preferred that the exhibition occur during once a discreet program is accessed. In such a scenario, the graphic overlay is depicted during the potential emergency situation without other programs and elements thereof appearing simultaneously with the graphic overlay(s). The graphic overlay may also be available in a more passive state as an indefinitely displayed, or indefinitely available in instances where the graphic overlay is not displayed during tracing thereof, backdrop to a home screen. A home screen for the present invention is a state of a computer operating system whereby access to multiple programs may be achieved from a versatile starting point. Exhibition of the graphic overlay(s) may occur during application of a screen saver or other program that includes sizable decorative features. In such cases, the graphic overlays may be camouflaged within or nearby other graphics. The graphic overlay may be in motion and only sedentary upon the user's contact with the screen.

The graphic overlay may change over time and with or without notice to the user. When the graphic overlay is exhibiting during predetermined time periods, for example, the user really need only be aware that there is a graphic to be traced rather than a particular graphic. In a screen saver whereby multiple graphic are sequentially depicted, the tracing of any of the graphics may lead to the initiation step. The graphic overlays may be characterized in terms of general properties. For example, closed shapes may contact policing departments, lines may contact fire departments, etc. The general properties may be based on any of the decisions of the present invention such as category, geography, etc.

Figure 3:
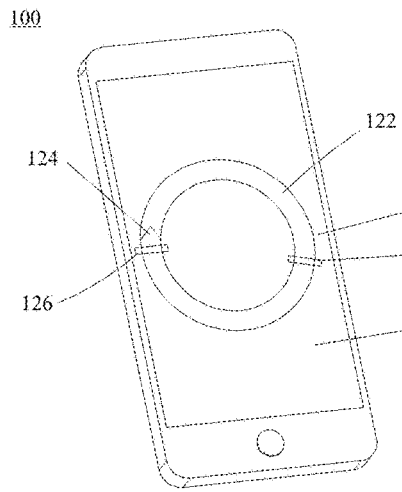
FIG. 3 is an orthographic view of the present invention.
Figure 4:
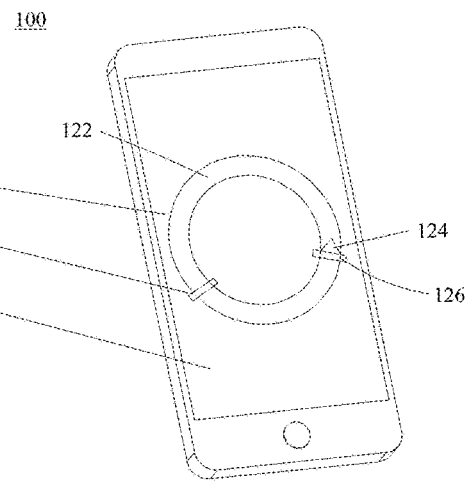
FIG. 4 is an orthographic view of the present invention.

Turning now to FIG. 3 and FIG. 4, the preferred graphic overlay 120 may include an alarm path length 122, a direction indicator 124, and boundaries 126. The alarm path length 122 provides a traceable path superimposed on the graphic path length that need not be the entire length of the graphic overlay path, or may be greater than the graphic overlay path because the alarm path length 122 reverses direction and contacts the same point of the graphic overlay path multiple times. In the preferred graphic overlay of FIGS. 3 and 4, the graphic overlay imitates a combination lock where the boundaries act as a start point and end point for the "turns" of the combination lock face. When the user reaches one boundary 126, then the other boundary 126 may alter to indicate the next point of the combination lock turn. The direction indicator indicates the direction in which the finger may be moved. When the appropriate number of turns at the appropriate points along the graphic overlay have been reached the distress signal may be transmitted 308. The combination embodiment of the present invention is particularly suited for embodiments whereby the graphic overlay may be hidden during the initiation step, or the graphic overlay may be exhibited during the initiation step while the boundaries and direction indicators are hidden (but the boundaries and direction indicators exhibited in an earlier viewing of the graphic overlay), or a false graphic overlay and/or false boundaries and direction indicators are exhibited.

Figure 5:
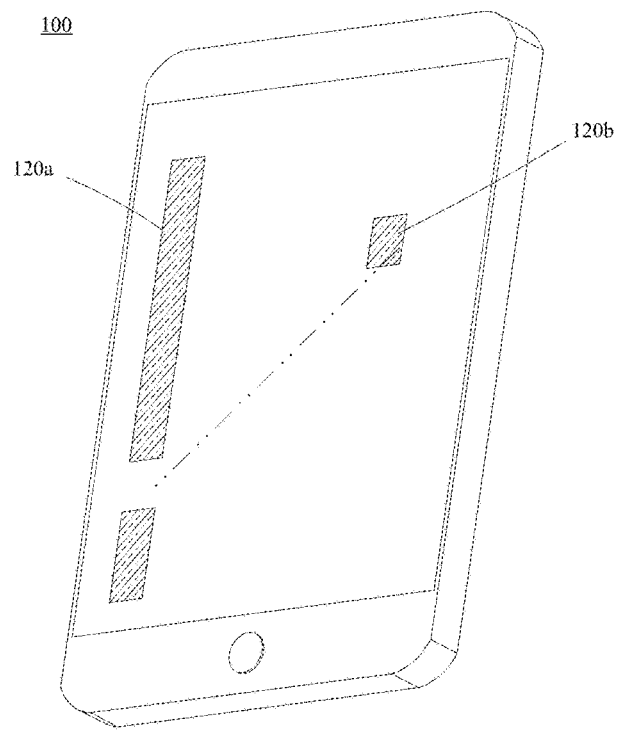
FIG. 5 is an orthographic view of the present invention.

Turning now to FIG. 5, a portable tablet computer 700 is depicted. The graphic overlay version of FIG. 5 indicates a fragmented graphic overlay. The fragmented graphic overlay includes at least two portions, a discontinuous portion 120a and a complementary portion 120b. A user drags the complementary portion 120b to the discontinuous portion 120a to complete the graphic overlay, and upon completion of the graphic overlay, the distress signal may be transmitted 308.

Figure 6:
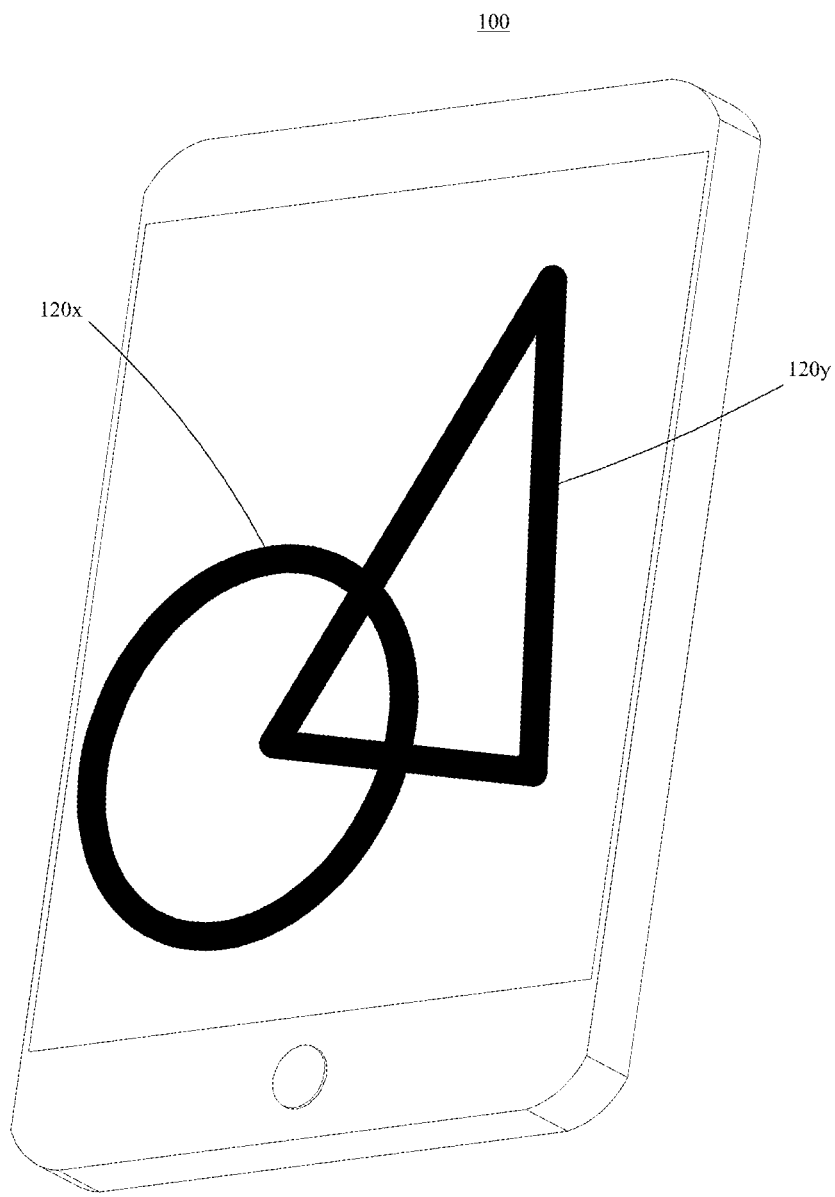
FIG. 6 is an orthographic view of the present invention.

Turning now to FIG. 6, the present invention may include two or more graphic overlays 120x, 120y. The graphic overlays may be exhibited simultaneously, or sequentially during a discreet setup period or during the initiation step 306. One graphic overlay may confirm you are intending to connect the confirmed Distress Signal. One graphic overlay sends only the location of the device to emergency service providers. One graphic overlay may be associated with a discreet set of user profile information, while another graphic overlay may be associated with a second set of user profile information. One graphic overlay may be associated with a discreet emergency service provider contact, while another graphic overlay may be associated with a second emergency service provider contact. One graphic overlay may be associated with a discreet emergency category, e.g., fire, while another graphic overlay may be associated with a second emergency category, e.g. crime. The graphic overlays may be exhibited together with one graphic overlay colored differently from the other, or whereby one graphic overlay includes a distinct shape. The graphic overlays may be differentiated in any meaningful way and they can vary as well to prevent hacking.

The preferred transmission 308 divulges the device's geolocation and phone number if applicable and indicates it is an emergency to the emergency service provider. A user may supply any number of emergency categories to one or more graphic overlays. The emergency categories may be logically subdivided into any number of divisions, including "general," "bystander" "crime," "fire," "poison," "medical," or other. These categories may or may not be divulged to the emergency service provider electronically directly and expressly. By directly, it is meant that the category is indicated to the emergency service provider in some manner whether visually or orally. By expressly, it is meant that the category is unaltered whereby "crime" is shown to the emergency service provider on a screen or audibly communicated. The category may also be indirectly divulged or altered. By indirect, it is meant that the category is communicated in some manner other than express, and by indirectly, it is meant that the category is communicated indicative of the category, for example, indicating a genus (e.g., "fire" or "ambulance") or species (e.g. "possible sexual assault") of the category.

The transmission 308 may be by any means known in the art to communicate an emergency to an emergency service provider. Preferred versions of transmissions include http transmission, telephone call, text, instant message or SMTP communication. The transmitter 150 may include telephone antennae, a modulation/demodulator, or other means for transmitting electromagnetic signals.

The present invention acquires 312 emergency contact information. The acquisition may be static whereby the user supplies emergency contact information for any emergency service provider related to one or more graphic overlays. The acquisition may be dynamic in that the emergency contact information is derived from an external database on or about the time of transmission 308 to ascertain the nearest logical emergency service provider. The dynamic means of acquisition may be preferred in such instances when a user has changed his/her location. The dynamic acquisition may take multiple forms including bypassing a static acquisition, or using a combination of static acquisition and dynamic acquisition whereby the acquisition step 312 includes at least comparing the statically acquired contact information to a recommended contact information based on a search of localized emergency service providers.

Figure 10:
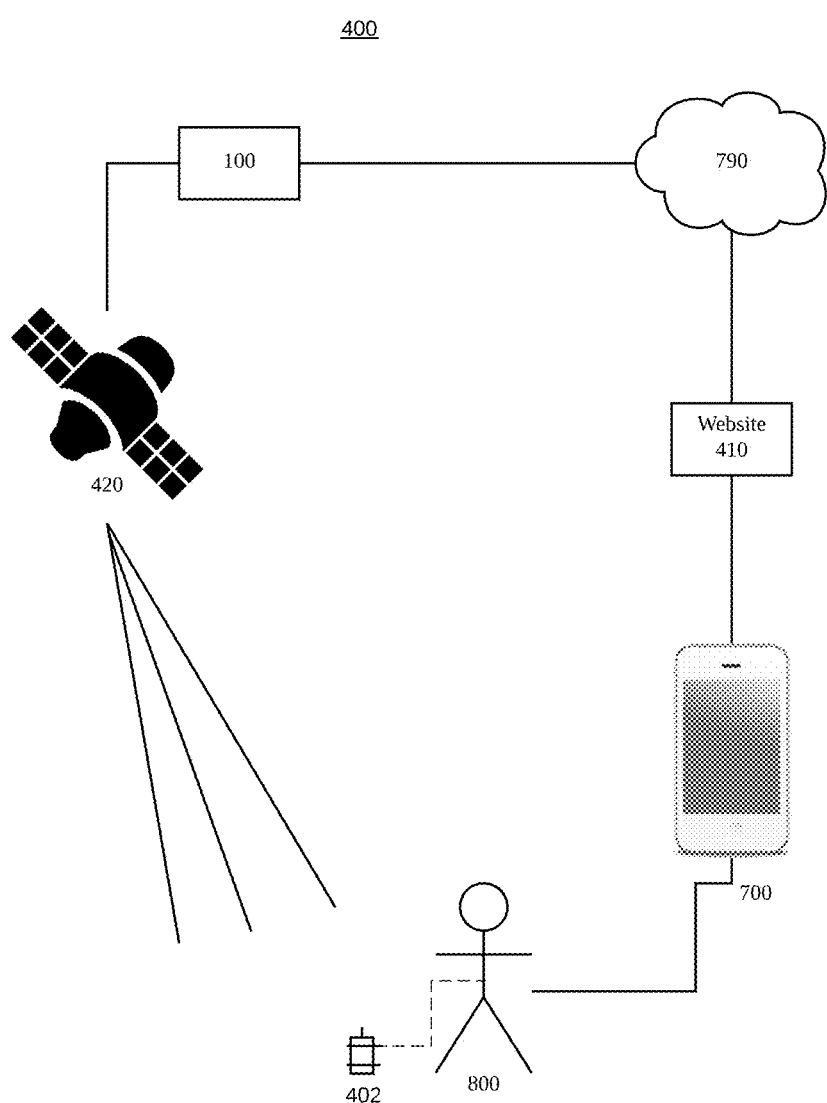
FIG. 10 is a view of a system of the present invention.

As shown by FIGS. 9 and 10, the present invention may further include a system 400. The system includes the computer of the present invention along with a position indicator 402. The position indicator 402 is carried by a user 800 and sought 310 upon transmission of the distress signal. In many instances, the computer 700 of the present invention may be discarded by the user or a hostile actor, or the user may gain later access to a computer. In the case of the former, the computer is used to configure the Distress Routine 302, exhibit the graphic overlay 304, initiate 306 the distress transmission while the position indicator is sought 312 rather than the computer. In the case of the latter instance, the system 400 may include a computer not owned by the user being sought. Instead the graphic overlay may be exhibited via an http transmission over a WAN 790 to a computer to which the user merely has access. The user may solve the graphic overlay to transmit 308 the distress signal. In instances whereby the graphic overlay may be obscured from general observation, but perhaps not to the user being sought, the graphic overlay may be integrated within the alphanumerics of a website 410. For example, a user may trace the headings of a news article of a website purposefully created for a user to access during a period of distress, or a user may trace shapes on a phony advertisement on the website. The website may be configured to run as a subroutine the graphic overlay exhibition 304.

The position indicator 402 of the present invention may include any device capable of being electromagnetically queried as part of a passive/active transmission system or actively transmit data identifying the user. It is further preferred that geolocation data be supplied by the position indicator 402 or a transmission from the position indicator, e.g. signal triangulation. When a passive transmission system is utilized, an interrogation device 420, e.g. a satellite, cellular tower, or RFID signal generator, broadcasts a response signal. Circuitry in the position indicator accepts the broadcast, which it then utilizes to power a return broadcast. Passive transmission systems are preferred because a power source is not necessary, and a return (and potentially concealment-ending) broadcast is provided only at meaningful times. Active transmission units may be utilized when a constant or periodic transmission may be utilized without harming the user.

A user may be acquired, for example, as a hostage, or as a domestic or child abuse victim. The user who has already performed the configuration steps of the present invention may access a computer terminal 702, irrespective of ownership. The user may have a specialized url, known only to him or her, that can be accessed over the Internet. The specialized url includes the graphic overlay of the present invention, and the user's solution of the graphic overlay can alert an overseeing body to the status of the user, and with recourse to the position indicator, locate the user. The graphic overlay can include multiple solutions related to multiple categories of harm, e.g. "hostage" or "successful infiltration" or "infiltration with need for extraction." Contact information should be pre-loaded to include the overseeing body, or perhaps a subunit thereof capable of affecting the category of need of the user. Because the graphic overlay may be hidden or seem insubstantial, transmissions may be generated in plain site of hostile actors or abusive partners in many circumstances and through any computer.

Figure 11:
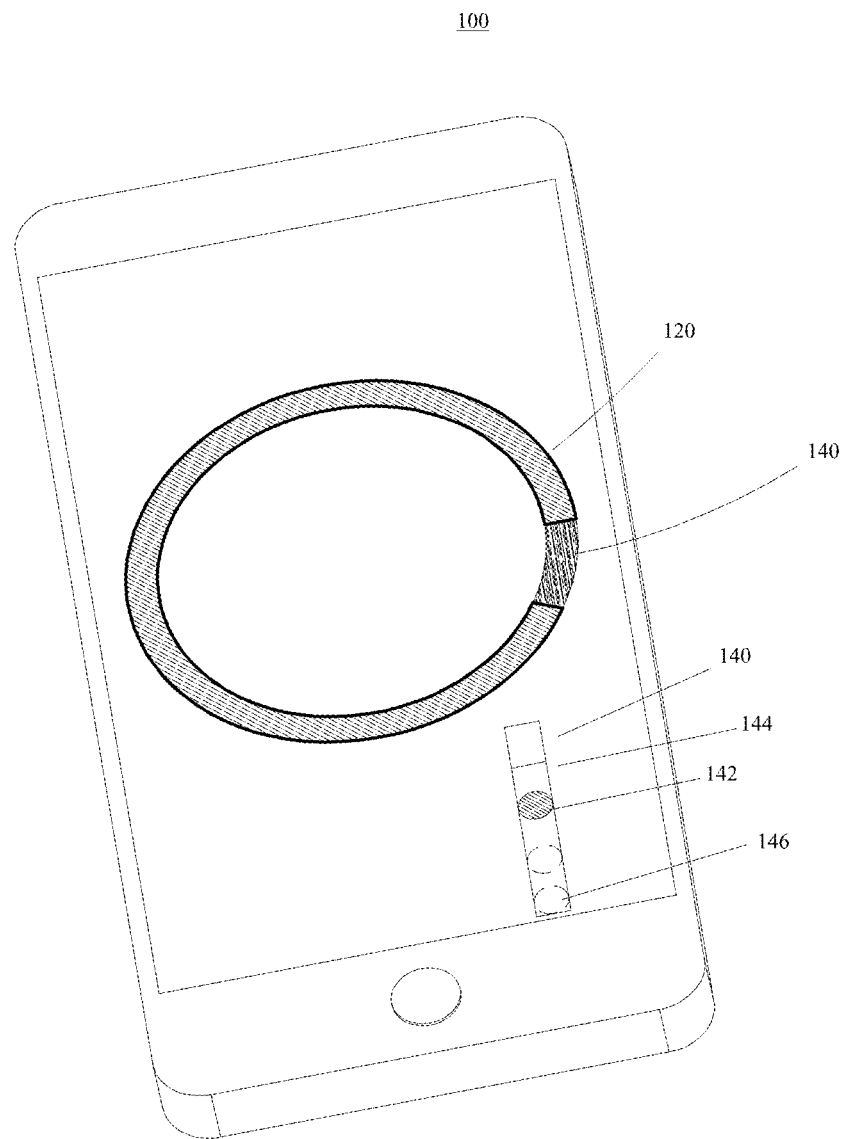
FIG. 11 is a view of a system of the present invention.

Turning to FIGS. 9 and 11, the present invention may further include a sub process for obscuring 314 any indication that a transmission was sent. The obscuring step 314 may include global and specific steps to minimize any indication of a transmission or the graphic overlay, or other aspects of the present invention that are visually ascertainable. By minimization, it is meant some action has been taken that makes it unclear that the present invention has been utilized. This may be because traces of the present invention have been erased or hidden to make actions taken by the present invention not immediately apparent. By specific steps, it is meant steps practiced by invention to obscure transmission indicia brought about by the process itself. Indicia brought about by the process include the graphic overlays, indications of successful transmission, visible user information, etc. By global steps, it is meant steps practiced by a computer irrespective of the presence of the invention, including general settings of stored telephone numbers that have been dialed, confirmation receipts of access to emergency service providers and the like.

In the preferred embodiments, a user in an emergency can activate the graphic overlay corresponding to the emergency service desired. The graphic overlay may appear, and the user may trace the shape of the graphic overlay. The graphic overlay then disappears without any indication that the graphic overlay appeared or that the computer contacted another entity. Dangerous situations may often be created because a hostile actor knows of a victim's attempt to seek assistance. Because the present invention may immediately obfuscate any aspect of the program's use (specifically), or the computer's use of the program (globally), the present invention injects another layer of safety.

The obfuscation may be automatic (such that no further actions are required and the obfuscation occurs immediately upon some other action), or the obfuscation may be selected by use of an obfuscation trigger 140. The obfuscation trigger may include any means of interaction with the computer that allows a brief physical motion to impart the desire to obfuscate. A preferred means of obfuscation includes the use of an augmented graphic overlay. By augmented graphic overlay it is meant that a portion of the graphic overlay 120 is reserved for trace to indicate that the use of the invention is to be obfuscated subsequent to use. By way of example, the first 80% of a graphic overlay 120 may be used as the basis of indicating the desire to engage in a transmission to an emergency service provider, whereas the second 80% of a graphic overlay, as the trigger 140, may be used as the basis of indicating the desire to obfuscate the use of the invention. A user who merely traces the first 80% of the graphic overlay indicates that they want to utilize the transmission of the present invention without the obfuscation. A user who traces 100% of the graphic overlay, or perhaps even some number between 80-100% of the graphic overlay, the user indicates that they wish to activate the transmission of the present invention along with the obfuscation.

Alternatively, the trigger 140 may comprise a separate entity that allows indication of obfuscation in connection with the trace of the graphic overlay. The trigger, for example, may include a trigger activator 142 that begins in an initial position 146 that requires a user to move the activator along a path to a designated trigger point 144, whereby once the activator passes the trigger point, the invention understands that obfuscation actions are to be taken.

Simply because the invention is obfuscated does not require the obfuscation to be permanent. The obfuscation may be timed to prevent merely the timely review of the computer for indications of the present invention. The most likely time for an aggressor to review the computer for indications of transmission are immediately subsequent to physical activity upon the computer; therefore, the obfuscation may be timed to expire and reveal activities specific and global related to the use of the present invention, and all actions related thereto.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A distress signal transmission device comprising:
    a computer with a body and having an arithmetic logic unit ("ALU"), a nontransitory computer-readable storage medium in signaled communication with said ALU, a display on said body having a touch digitizer; and a transmitter for the transmission of data to an external entity;
    a distress routine, recited within said storage medium, having the device's current GPS location and/or preloaded user profile information having access to an emergency contact database, and adapted to transmit a distress signal bearing an emergency distress category to an emergency assistance provider while divulging said user profile information; and
    a two-dimensional graphic overlay, graphically exhibited on said display, having
    a graphic path length and path direction variable in two-dimensions, whereby an uninterrupted physical trace along an alarm path length of, and co-extensive with, said graphic overlay answers a solution that initiates said distress signal; and
    an obfuscation routine adapted to minimize indications of at least one of said graphic overlay and said distress routine subsequent to the activation thereof.

2. The device of claim 1 wherein said alarm path length is at least equal to said graphic path length co-extensive with said graphic overlay.

3. The device of claim 1 wherein said alarm path length is less than said graphic path length.

4. The device of claim 3 wherein said alarm path length is less than said graphic path length and said graphic overly includes boundaries demarcating said alarm path length.

5. The device of claim 4 wherein said alarm path length includes a path reversal wherein a portion of said graphic overlay is required to be contacted at least twice to answer said solution.

6. The device of claim 1 wherein said alarm path length is not exhibited during said physical trace.

7. The device of claim 6 wherein said graphic overlay is not exhibited during said physical trace.

8. The device of claim 6 comprising at least two graphic overlays, each corresponding to a distinct emergency category.

9. The device of claim 1 comprising at least two graphic overlays, each corresponding to a distinct emergency category.

10. A distress signal transmission device comprising:
    a computer with a body and having an arithmetic logic unit ("ALU"), a nontransitory computer-readable storage medium in signaled communication with said ALU, a display on said body having a touch digitizer; and a transmitter for the transmission of data to an external entity;
    a distress routine, recited within said storage medium adapted to transmit a distress signal to an emergency assistance provider;
    a two-dimensional graphic overlay, graphically exhibited on said display, having a graphic path length and path direction variable in two-dimensions, whereby an uninterrupted physical trace along an alarm path length of, and co-extensive with, said graphic overlay answers a solution that initiates said distress signal; and
    an obfuscation routine adapted to minimize indications of at least one of said graphic overlay and said distress routine subsequent to the activation thereof.

11. The device of claim 10 wherein said alarm path length is at least equal to said graphic path length co-extensive with said graphic overlay.

12. The device of claim 10 wherein said alarm path length is less than said graphic path length.

* * * * *